United States Patent [19]
Wilson et al.

[11] Patent Number: 5,759,620
[45] Date of Patent: Jun. 2, 1998

[54] FORMATION OF COMPOSITE MATERIALS BY THE INWARD DIFFUSION AND PRECIPITATION OF THE MATRIX PHASE

[75] Inventors: Roger E. Wilson, Silver Spring, Md.; Joseph M. Augl, Stirling Park, Va.

[73] Assignee: The United States of America as represented by the Secretary of the Navy, Washington, D.C.

[21] Appl. No.: 279,414

[22] Filed: Jul. 1, 1981

[51] Int. Cl.$^6$ ........................ B05D 3/00
[52] U.S. Cl. ........................ 427/228
[58] Field of Search ........................ 427/228, 380, 427/419.7, 419.8, 384; 264/29.2, 60

[56] References Cited

U.S. PATENT DOCUMENTS

| | | | |
|---|---|---|---|
| 3,026,214 | 3/1962 | Boyland et al. | 427/228 |
| 3,208,870 | 9/1965 | Criss | 427/228 |
| 3,644,135 | 2/1972 | Speyer | 427/228 |
| 3,682,686 | 8/1972 | Nakamura et al. | 427/238 |
| 3,778,301 | 12/1973 | Wohlberg | 427/228 |
| 4,196,230 | 4/1980 | Gibson et al. | 427/228 |

*Primary Examiner*—Charles T. Jordan
*Assistant Examiner*—Anthony R. Chi
*Attorney, Agent, or Firm*—John Forrest; Roger D. Johnson

[57] ABSTRACT

A process for preparing a composite of two or more continuous phases, one of which is tantalum carbide or a mixture of tantalum carbide and carbon which comprises (1) impregnating a preform of graphite or a similar material in the form of a porous block or woven fiber form with a reactive carbon source such as petroleum pitch, a coal tar pitch, a thermal setting resin, or a sugar;
(2) pyrolyzing the reactive carbon source to form carbon;
(3) impregnating the preform with either $Ta(OCH_3)_5$ or $Ta(OCH_2CH_3)_5$ under anhydrous conditions;
(4) hydrating the $Ta(OCH_3)_5$ or $Ta(OCH_2CH_3)_5$ to precipitate $Ta_2O_5$ throughout the preform; and
(5) heating the preform at a temperature of 1400° C. or more until the $Ta_2O_5$ has reacted with the carbon to form tantalum carbide.

40 Claims, 3 Drawing Sheets

FORMATION OF COMPOSITE MATERIALS BY THE INWARD DIFFUSION AND PRECIPITATION OF THE MATRIX PHASE

BACKGROUND OF THE INVENTION

This invention relates to continuous multiphase composites and more particularly to such composites in which one of the phases contains TaC.

It has become generally accepted that to accurately and reliably deliver a warhead to a target, the missile nosetip must have a high resistance to shape change from rain, ice and dust erosion as well as from ablation. While nosetips of certain bulk graphites and carbon—carbon composites are satisfactory in ablation, they fall far short in their resistance to erosion. Erosion resistance could probably be improved to some degree by the addition of a dense hard phase to either the bulk graphite or a carbon—carbon composite. However, the thermal stress resistance of bulk graphite is somewhat marginal and the addition of any of the known hard materials with their inherent high coefficients of thermal expansion would be expected to make matters worse. Carbon—carbon composites, on the other hand, have high strengths and high resistance to thermal stress failure making the addition of dense, hard, high thermal expansion materials to their structures more feasible. Even in this case, the extreme expansion mismatch between the hard materials and the graphite fibers particularly in their axial direction is a problem. To alleviate this problem it appears desirable to have the matrix of the composite consist of the hard material plus a considerable amount of "free" graphite. An excess of carbon in the matrix would lower its coefficient of thermal expansion and also help retain the ablation performance of a carbon—carbon composite. Composites comprising a carbon or graphite preform which is impregnated with a continuous matrix of a mixture of carbon and tantalum carbide are of particular interest. It would be desirable to develop improved methods of preparing such multiphase composites.

Multiphase composites are fabricated by either of two methods: (A) infiltration of a porous solid with a liquid which solidifies by freezing or chemically crosslinking, and (B) infiltration of a porous solid with a solvent bearing a solute which is deposited upon evaporation of the solvent. To employ either method, it is essential that the porous solid have continuous, interconnected pores extending from its surfaces to its center. Such porous solids may be made by sintering a compact of particles to form a strong, porous skeleton or they may be formed by weaving wires or fibers so as to form a three dimensional array having continuous interconnecting pores. These porous sintered or woven solids are usually called "preforms".

Method, A, i.e., impregnating with a liquid which solidifies by freezing or chemically crosslinking has certain limitations. Solidification by chemical crosslinking applies generally to organic polymers and, therefore, the composite so formed is limited in its application temperature to the temperature limit of the polymer. Of course, the polymer may be pyrolyzed and converted to carbon or graphite thus forming a very high temperature material. However, the present invention relates primarily to composites having matrices other than carbon and having application temperatures well above the temperature limits of organic polymers.

Composites formed by impregnating the preform or skeleton with a molten material and subsequently cooling to solidify it also have limitations. For example, the melting point of the desired second phase in many cases may be above the melting point of the preform and would destroy it upon impregnation. In other instances the desired second phase when molten may react with or dissolve the first phase which would also destroy the preform.

In method B, a dissolved material is deposited in the pores of a preform by evaporation of the solvent. Using this method, an inert solvent is employed to carry the desired material into the porous skeleton or preform and the solute is caused to precipitate by evaporation of the solvent. One fundamental limitation of this method is that the solute is deposited mainly at, or very near, the surface since evaporation can occur only at the surface. High density composites are achieved by repeated impregnation and evaporation cycles. Internal pores become increasingly difficult to fill with each cycle as pores near the surface become smaller causing both impregnation and evaporation processes to become impeded.

One technique which may be used to avoid concentration of the deposite near the surface is to "freeze dry" the solvent from the composite. That is, by freezing the solution in the preform the solvent is no longer mobile but can be sublimed by lowering the pressure of the surrounding atmosphere approaching a vacuum. While the "freeze drying" method of solvent removal may be used in some cases, it is a time consuming step making the over-all process much less efficient in respect to time required. A second instance in which concentration of the deposits near the surfaces may be avoided is when the impregnated solution forms a gel. However, achieving an even distribution using this method is limited to those systems which can be made to form a suitable gel. An example of this method is cited in U.S. Pat. No. 4,196,230, which issued to James O. Gibson on Apr. 1, 1980.

Another, and very important, limitation to the efficiency of this method, B, is the solubility of the solute in the solvent. A solvent must be chosen which does not destroy the skeleton of preform but readily dissolves the solute desired. In many cases the solute has a very limited solubility in the solvent and, therefore, deposits a very small volume of material during each impregnation and evaporation cycle.

In the specific case of producing composites of graphite fiber preforms with tantalum carbide matrices, a number of these problems occur. Graphite fiber preforms cannot be filled by impregnating with molten tantalum carbide (TaC) because the melting point of TaC is 3880° C. which is well above the melting point of graphite, 3500° C. Graphite preforms have been filled with tantalum oxalate and then reacting this with an active carbon such as sucrose char to form tantalum carbide. This process has the two disadvantages cited above: (1) the solubility of the tantalum oxalate in water is very low, (below 14%), and (2) most of the material is deposited near the surface since precipitation is caused by evaporation. Also graphite fiber preforms may be densified with a tantalum carbide matrix by using tantalum pentafluoride in a water solution as disclosed in the Gibson et al patent, (U.S. Pat. No. 4,196,230), supra. Tantalum pentafluoride is more soluble in water than tantalum oxalate, making the Gibson process more efficient than the oxalate process. Yet, it would be desirable to have a process which is even more efficient.

SUMMARY OF THE INVENTION

Accordingly, one object of this invention is to provide a method for making multiphase composite materials in which at least two of the phases are continuously and thoughly and evenly distributed throughout the composite.

Another object of this invention is to form dense composites of two or more phases while retaining the desirable physical, chemical, and mechanical properties of each phase.

A further object of this invention is to provide an improved method of producing graphite fiber-tantalum carbide composites.

A still further object of this invention is to provide an easier method of producing graphite fiber preform tantalum carbide composites.

Yet another object of this invention is to provide a method of producing composites for missile nose tips that have better ablative properties and erosion resistance.

These and other objectives of this invention are accomplished by providing a process for producing a preform reinforced tantalum carbide composite comprising the steps of:

(1) impregnating a preform having continuous porosity with a carbon char source which is a sugar in aqueous solution, a thermal setting resin, a petroleum pitch, or a coal tar pitch;

(2) pyrolyzing the reactive carbon source to form a char;

(3) impregnating the preform with a tantalum source which is selected from the group consisting of $Ta(OCH_3)_5$ and $Ta(OCH_2CH_3)_5$ under anhydrous conditions;

(4) hydrating the tantalum source to precipitate $Ta_2O_5$ in the preform; and (5) heating the composite at a temperature of from 1400° C. to 3000° C. until the $Ta_2O_5$ has reacted with the reactive carbon to form TaC.

BRIEF DESCRIPTION OF THE DRAWINGS

FIGS. 1 and 2 are discussed in more detail in example 1 and FIGS. 3 and 4 are similarly discussed in more detail in example 2.

DETAILED DESCRIPTION OF THE PREFERRED EMBODIMENT

Figure 1:
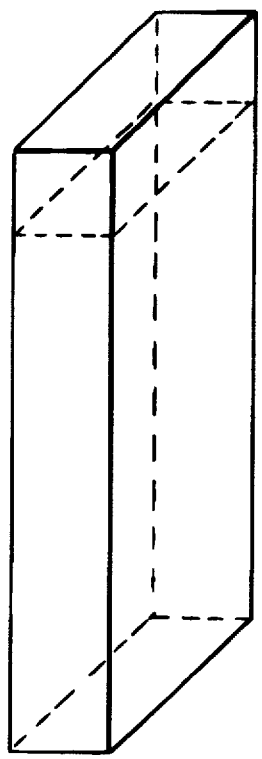
FIG. 1 illustrates the taking of a sample from a treated preform in Example 1.

The composites produced by the processes of the present invention comprise continuous matrices of tantalum carbide (TaC) or preferably a mixture of tantalum carbide and carbon, reinforced with a preform. The essential features of the preform is is that its porosity must be continuous and that it must be made of a material which is stable in contact with TaC at its sintering temperature. Continuously porous bulk graphite or carbon, preforms may be used, but fiber preforms are preferred, with woven fiber preforms being more preferred. When woven preforms are to be densified, the 4-B, 5-D, and 7-D weave constructions are preferred over the 3-D weave constructions because of the larger interconnecting pores they provide. The fibers are preferably made out of graphite, carbon, or silicon carbide, with graphite being most preferred. Specific examples of suitable preforms are disclosed by Gibson et al in U.S. Pat. No. 4,196,230, supra, at column 3, lines 23–55, herein incorporated by reference.

The graphite fiber preforms are preferably stabilized or rigidized before being treated by the process of the present invention. This can be done by conventional techniques such as impregnation with pitch, followed by pyrolysis and graphitization. As a result of this treatment, the fibers are bonded together and the graphite fiber weave becomes rigid. This means that the shape of the preform will change little during the processing of the present invention. As a result, the preforms can be cut roughly to their final shape prior the inward diffusing and reacting (IDAR) process, with only minor machining to tolerances being required afterward.

The inward diffusing and reacting process (IDAR) of this invention can be summarized as follows:

Step 1. Impregnating the preform with a free carbon source such as a petroleum pitch, a coal tar pitch, a thermosetting resin, or preferably a sugar.

Step 1A. (omitted for pitches or resins and optional but preferred for sugars) Heating slowly at rate of 0.1°–4.0° C./min. to a temperature of 180° to 250° C. to dry and decompose the sugar.

Step 2. pyrolyzing the free carbon source at a temperature of from 400° to 600° C. to form a char (free reactive carbon).

Step 3. Impregnating the preform with either tantalum pentamethoxide, $Ta(OCH_3)_5$, or tantalum pentaethoxide, $Ta(OCH_2CH_3)_5$, under anhydrous conditions (dry preform under a dry atmosphere).

Step 4. Infiltrating the preform with water vapor which reacts with the $Ta(OCH_3)_5$ or $Ta(OCH_2CH_3)_5$ to precipitate tantalum pentoxide, $Ta_2O_5$, throughout the preform. This step is preferably performed at a temperature of from 100° to 200° C. under a pressure of from 150 to 300 psi.

Step 5. Heating the preform at a temperature of at least 1400° C. but low enough that the fibers of the preform are not damaged until the $Ta_2O_5$ has reacted with the carbon to form TaC.

The process is repeated until the desired reduction in porosity is achieve.

The first step in forming the necessary reactive carbon is to impregnate the preform with a reactive carbon source. Suitable sources include coal tar pitches, petroleum pitches, thermal setting resins, and sugars. Of the sugars glucose, fructose, sucrose, maltose, and lactose are preferred, with sucrose being more preferred. Suitable thermal setting resins include phenolic resins, epoxy resins, and furfuryl resins.

The source of tantalum used is either tantalum pentaethoxide, $Ta(OCH_2CH_3)_5$, or tantalum pentamethoxide, $Ta(OCH_3)_5$. $Ta(OCH_3)_5$ offers the advantage of containing 53.8 weight percent of tantalum as compared to 44.54 weight percent for $Ta(OCH_2CH_3)_5$. However, $Ta(OCH_3)_5$ is a waxy solid (M.P. 80° C.) at room temperature requiring elevated temperatures or solution in methanol for satisfactory impregnations. On the other hand, pure tantalum pentaethoxide is a liquid at room temperature and therefore preferred.

It is critical that the impregnation of the preform with $Ta(OCH_2CH_3)_5$ or $Ta(OCH_3)_5$ be performed under anhydrous conditions. This means that the preform must be dry and that the impregnation step must be performed in a dry atmosphere (e.g., dry argon). Pure, undiluted $Ta(OCH_2CH_3)_5$ may be directly vacuum impregnated with soaking into the preform at room temperature. This procedure is continued until the pores of the preform are completely filled. The procedure using $Ta(OCH_3)_5$ is similar except it must either be done at a temperature high enough that $Ta(OCH_3)_5$ is a liquid or the $Ta(OCH_3)_5$ must be dissolved in methanol.

Next the saturated preform is placed directly in contact with water vapor (i.e. steam) to cause hydration and precipitation of tantalum pentoxide within the pores of the preform. In this step the water diffuses inward through the tantalum pentaethoxide (or tantalum pentamethoxide) in the pores, precipitating tantalum pentoxide and forming ethanol (or methanol) according to the following reaction:

$$2Ta(OR)_5 + 5H_2O \rightarrow Ta_2O_5 + 10 ROH \ (R=\!\!-\!CH_3 \text{ or } -\!H_2CH_3).$$

Unlike prior art process which depend on evaporation of solvents to cause the precipitation of tantalum containing compounds, the present process precipitates tantalum pentoxide, $Ta_2O_5$, without evaporation of solvent. As a result, a more uniform distribution of TaC throughout the preform is achieved.

The final step of the process is to heat the preform at a temperature of from 1400° C. to 3000° C., but preferably from 1400° C. to 2700° C., until the tantalum pentoxide has been reduced to tantalum metal and the tantalum metal has reacted with the carbon to form tantalum carbide. The reactions can be represented as follows:

$$\begin{array}{r}Ta_2O_5 + 5C \rightarrow 2Ta + 5CO \\ 2Ta + 2C \rightarrow 2TaC \\ \hline Ta_2O_5 + 7C \rightarrow 2TaC + 5CO\end{array}$$

This process is done in an oxygen free atmosphere (e.g., argon).

The weight ratio of carbon (sugar char) to tantalum pentoxide, $Ta_2O_5$, can be varied to give a matrix layer which is either substantially tantalum carbide only or tantalum carbide plus carbon. When the preferred prefrom of rigidized graphite fibers is used, mixtures of tantalum carbide and carbon are preferred. As the amount of carbon is increased in the matrix, the coefficient of thermal expansion of the matrix material becomes closer to that of the graphite fibers. As a result, the thermal stress properties of the composite are improved.

The amount of carbon deposited per cycle can be controlled by both the sugar concentration in the aqueous sugar solution and the number of times the sugar char formation cycle (sugar impregnation and pyrolysis) is repeated. Usually, more than one sugar impregnation and pyrolysis cycle is required for each tantalum pentoxide formation cycle ($Ta(OCH_2CH_3)_5$ or $Ta(OCH_3)_5$ impregnation followed by hydration). AT least one of the sugar char formation cycles must be run before the $Ta_2O_5$ formation cycle. Additional sugar char formation cycles may be run either before or after $Ta_2O_5$ formation.

The sugars are preferably impregnated or infiltrated into the preform as aqueous solutions. A conventional impregnation procedure may be used. Next the preform is dried by heating slowly at a rate of 0.1°–4° C./min. through the 100° to 200° C. range. This drying procedure may create a flow of solvent and sugar toward the outer surfaces of the preform, tending to reduce the uniformity of the distribution of sugar and thus eventually the distribution of the carbon (sugar char).

As stated before, the reaction for the precipitation of tantalum pentoxide is as follows:

$$2Ta(OR)_5 + 5H_2O \rightarrow Ta_2O_5 + 10ROH \ (R=\!\!-\!CH_3 \text{ or } -\!CH_2CH_3).$$

Note that for every 5 moles of water vapor used up in the reaction, 10 moles of ethanol (or methanol) are generated. This causes a slight net flow of solution from the preform. This flow does not affect the precipitated $Ta_2O_5$; however, it will tend to draw tantalum pentaethoxide, $Ta(OCH_2CH_3)_5$, or tantalum pentamethoxide, $Ta(OCH_3)_5$, from the preform, resulting in a slight decrease in the uniformity of the distribution of TaC. Therefore, to improve the distribution of TaC still further, it is desirable that the rate at which tantalum pentoxide is precipitated be increased. This is done by autoclaving the preform at from 100° to 200° C. in a steam atmosphere at a pressure of from 150 to 300 psi.

For improved uniformity of carbon distribution, it is often more desirable to employ a thermal setting resin such as furfuryl, epoxy, or phenolic resins as a source of reactive carbon. A resin is vacuum impregnated into the preform, then cured and carbonized using conventional methods to form the reactive carbon. Example 3 provides a specific illustration of the procedure using a furfural-furfurol resin-mixture with phthalic anhydride. Note that when a resin is used as the carbon source, more than one $Ta_2O_5$ formation cycle [$Ta(OCH_2CH_3)_5$ or $Ta(OCH_3)_5$ impregnation and then hydration] may be necessary to adjust the $Ta_2O_5$ to carbon ratio so as to yield the desired TaC and C percentages in the final matrix.

The general nature of the invention having been set forth, the following examples are presented as specific illustrations thereof. It will be understood that the invention is not limited to these specific examples but is susceptible to various modifications that will be recognized by one of ordinary skill in the art.

EXAMPLE 1

Uniform and complete distribution of the tantalum carbide (TaC) formed within the preform is a key advantage of the present process. The following experiment was performed to determine the uniformity of deposition of the TaC using a small graphite fiber 4D preform.

A small rectangular 4D hexagonal Thornel 50™ woven preform (3"×0.56"×0.95"; see FIG. 1) was first rigidized by a single impregnation, pyrolysis, and graphitization cycle using Ashland A240™ petroleum pitch. The preform was then given a single inward diffusion and precipitation (IDAR) cycle. Table 1 summarizes the process steps included in the IDAR cycle with the necessary calculations.

TABLE 1

Brief Processing History and Calculations

| Step No. | Description Process Step or Calculation | Temp. (°C.) | Quantity | Block Weight-g |
|---|---|---|---|---|
| | Initial weight of Block | | | 28.568 |
| 1 | Sugar Char - 1st Impregnation | 400 | 0.530 g. | 29.098 |
| 2 | Ta(OCH$_2$CH$_3$)$_5$ Impreg. & Hydrolysis Ta$_2$O$_5$ wt. | 100 | 9.459 g. | 38.557 |
| | Calculated wt. of Carbon needed for reaction | | 1.80 g. | |
| | Calculated wt. of Free CArbon needed* | | 0.43 g. | |
| | Calculated total wt. of C needed | | 2.23 g. | |
| 3 | Sugar Char - 2nd Impregnation | 425 | 0.61 g. | 39.167 |
| 4 | Sugar Char - 3rd Impregnation | 425 | 0.77 g. | 39.937 |
| | Total Sugar Char deposited | | 1.91 g. | |
| | Calculated Free C available | | 0.11 g. | |
| 5 | Heat treatment - TaC - Formation and Sintering | 2750 | | 36.621 |
| | Weight of TaC - C Matrix Formed | | 8.053 g. | |

TABLE 1-continued

Brief Processing History and Calculations

| Step No. | Description Process Step or Calculation | Temp. (°C.) | Quantity | Block Weight-g |
|---|---|---|---|---|
| | Volume of Free C in Matrix | | 0.05 cc. | |
| | Volume of TaC in Matrix | | 0.542 cc. | |
| | Volume % Graphite in Matrix | | 8.45% | |
| | Volume % TaC in Matrix | | 91.55% | |
| | Density of Matrix | | 13.77 g./cc. | |
| | % Weight increase of Block | | 28.19% | |

In step 1 the preform was impregnated with a 40% solution of sucrose in water and then heated at 400° C. to form the sugar char (carbon). In step 2, the preform was impregnated with pure tantalum pentaethoxide, Ta(OCH$_2$CH$_3$)$_5$, under anhydrous conditions: the preform had been thoughly dried and the impregnation was performed in a dry argon atmosphere. The preform was then treated with steam (distilled water at 100°) to precipitate tantalum pentoxide in the preform, $2Ta(OCH_2CH_3)_5 + 5H_2O \rightarrow Ta_2O_5 + 10 CH_3CH_2OH$. The preform was dried and weighed to determine the amount of Ta$_2$O$_5$ present. The procedure of step 1 was repeated (steps 3 and 4) to bring the reactive carbon (sugar char) content up to the need amount. The amount of reactive carbon needed is the sum of (1) the carbon required to reduce tantalum pentoxide (Ta$_2$O$_5$) to tantalum metal (Ta), (2) the amount of carbon needed to convert tantalum metal to tantalum carbide (TaC), and (3) the amount of free carbon (C) desired in the TaC-C matrix. In step 5, the preform was heated at 2750° C. to form the tantalum carbide-carbon matrix.

Figure 2:
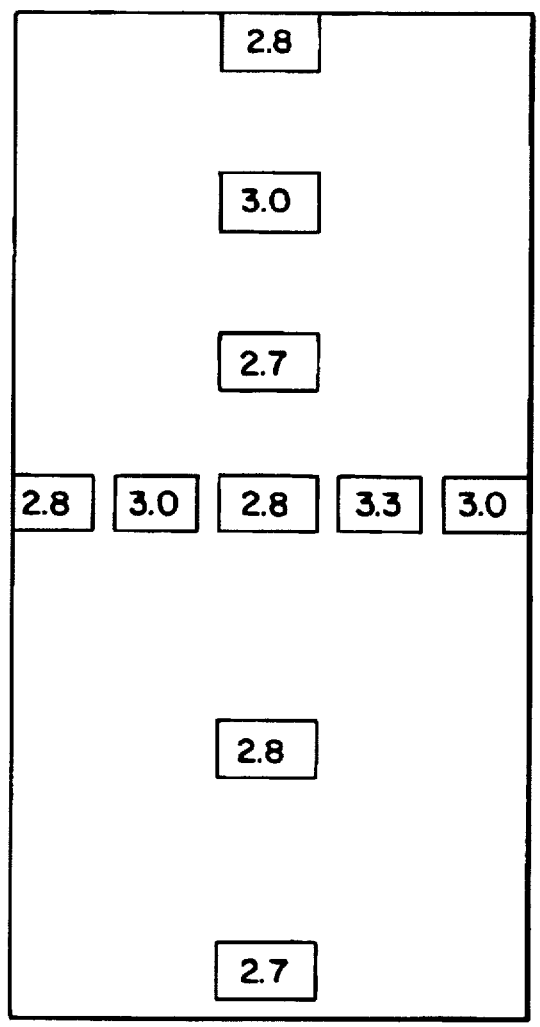
FIG. 2 shows the results of an SEM electron microprobe scan of the sample showing the distribution of TaC in the preform.

A 0.25"×0.95"×0.56" section was removed from the preform as shown in FIG. 1. The distribution of TaC from the surface to the center of the preform was then measured using an SEM electron microprobe. The tantalum carbide distribution was determined by comparing the tantalum L alpha peak intensity with background intensity at various locations on the cross section. Values given in the boxes of FIG. 2 are the ratios of peak to background intensity found for the areas outlined by the boxes. Also micrographs of tantalum area scans were made and they show the tantalum to be well dispersed through out the yarn bundles and between the individual fibers.

EXAMPLE 2

Figure 3:
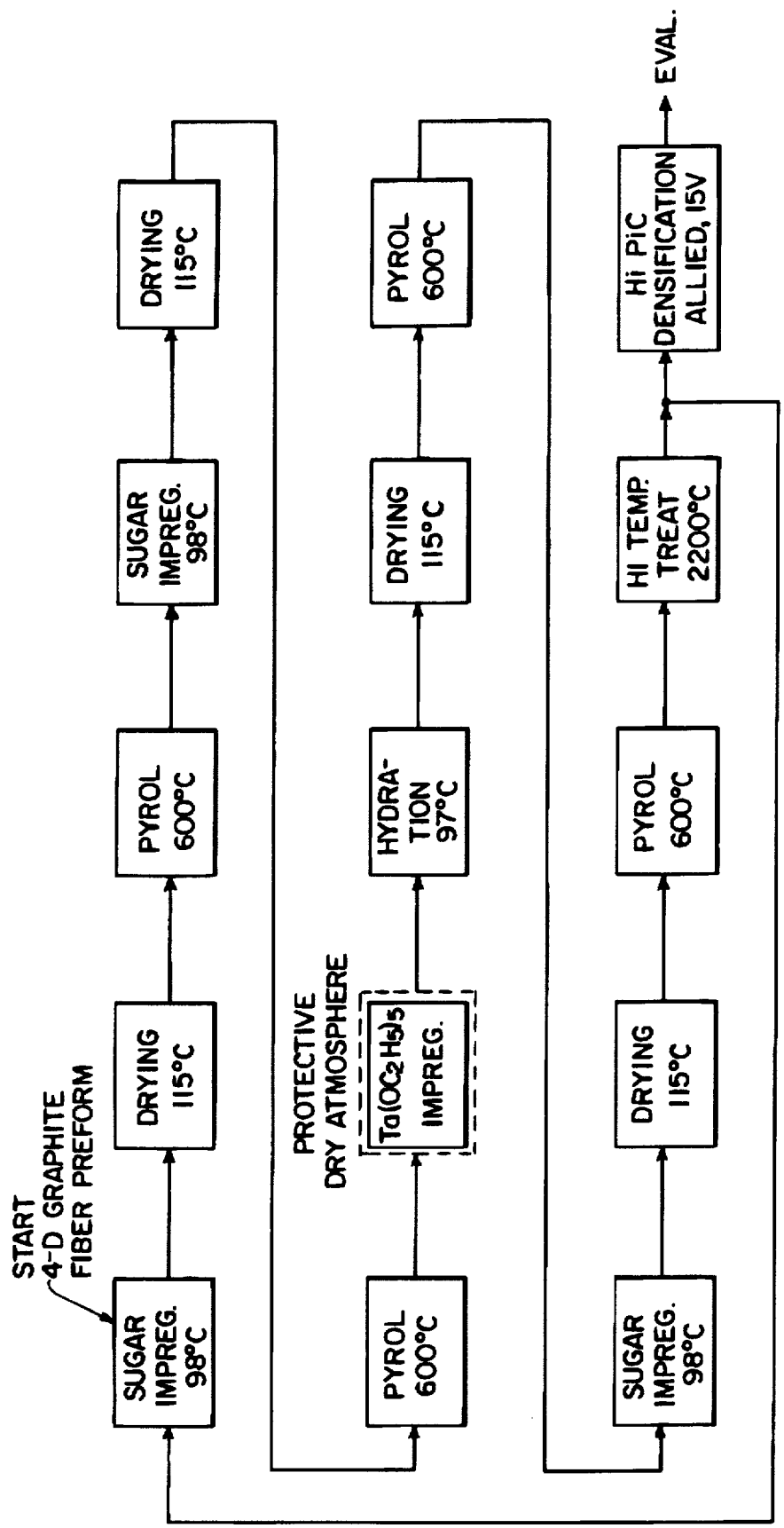
FIG. 3 is a flow chart summarizing the process used in example 2 to produce a typical TaC-C matrix/graphite fiber preform.

This example is the processing of a woven 4D Thornal 50™ preform measuring roughly 2⅛×2⅝×4"using the methods of this invention to reduce the preform open porosity from 43.6% down to 14.9% by forming in situ a matrix composed of 85 volume percent TaC and 15 volume percent carbon. A 4D pyramidal preform which had been rigidized by a single impregnation, pyrolysis and graphitization treatment cycle with Ashland Oil Company's A 240 pitch™ was used in this example. FIG. 3 show schematically the processing employed for the eighteen process cycles used to form the TaC and carbon matrix plus the three final pitch impregnation cycles used to reduce the open porosity from 14.9% down to 5%.

Figure 4:
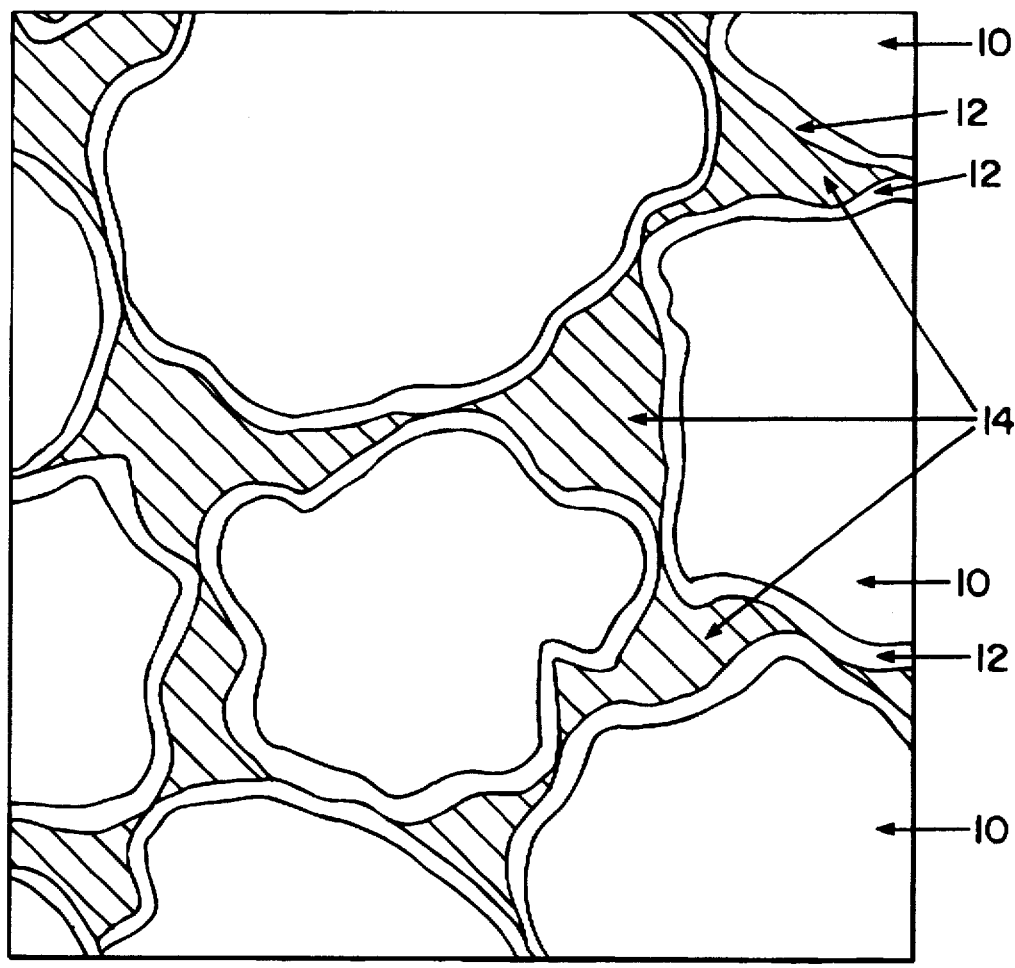
FIG. 4 illustrates an enlarged transverse cross sectional view of the TaC-C/graphite fiber preform produced in example 2.

The final pitch cycles were done by a high pressure impregnations and pyrolysis (HiPiC) process, which is common in the carbon—carbon composite industry, using Allied Chemical Company's 15 V Coal Tar Pitch. Table 2 shows the changes in dimensions and weight of the block during the eighteen inward diffusion and precipation (IDAR) process cycles. Table 3 shows the reduction in porosity and the amount and composition of the matrix formed during each IDAR densification cycle. Table 4 shows the final composition of the block after all densification cycles had been completed, giving weight and volume percentages. Metallographic polished specimens were made on the densified composite. As illustrated in FIG. 4, an enlarged transverse view of the composite, each graphite fiber 10 in the yarn bundles was surrounded by the tantalum carbide-carbon matrix 12. Also shown is the char 14 formed in the final 3 densification cycles. The rigidizing carbon from the initial Ashland A240™ pitch impregnation cycle was observed mainly in the interstices between the fibers.

TABLE 2

Summary of weight and Dimension Changes During Processing

| Cycle No. | Length in. | Width in. | Thickness in. | Volume cc | Weight grams | Wt. Increase grams |
|---|---|---|---|---|---|---|
| 0 | 4.115 | 2.700 | 2.180 | 397.2 | 417.4 | |
| 1 | 4.116 | 2.704 | 2.180 | 397.6 | 521.1 | 103.6 |
| 2 | 4.115 | 2.705 | 2.180 | 397.6 | 623.0 | 102 |
| 3 | 4.116 | 2.704 | 2.180 | 397.6 | 731 | 109.5 |
| 4 | 4.115 | 2.703 | 2.179 | 397.2 | 822.5 | 91.5 |
| 5 | 4.115 | 2.703 | 2.179 | 397.5 | 915.3 | 92.8 |
| 6 | 4.115 | 2.704 | 2.180 | 397.8 | 994.7 | 79.4 |
| 7 | 3.936* | 2.704 | 2.180 | 380.4 | 1013.0 | 75.4 |
| 8 | 3.933 | 2.701 | 2.177 | 379.0 | 1081.5 | 68.5 |
| 9 | 3.934 | 2.702 | 2.176 | 379.0 | 1139.5 | 58.0 |
| 10 | 3.934 | 2.702 | 2.176 | 379.0 | 1198.1 | 58.6 |
| 11 | 3.932 | 2.702 | 2.179 | 379.4 | 1242.6 | 53.5 |
| 12 | 3.932 | 2.702 | 2.178 | 379.2 | 1292.4 | 49.8 |
| 13 | 3.930 | 2.706 | 2.175 | 378.2 | 1338.5 | 45.1 |
| 14 | 3.932 | 2.703 | 2.177 | 379.2 | 1372.7 | 34.2 |
| 15 | 3.931 | 2.702 | 2.177 | 378.9 | 1417.5 | 44.8 |
| 16 | 3.930 | 2.701 | 2.175 | 378.3 | 1457.1 | 39.6 |
| 17 | 3.930 | 2.702 | 2.171 | 377.8 | 1496.9 | 39.8 |
| 18 | 3.930 | 2.702 | 2.175 | 378.5 | 1532.7 | 35.8 |

(*)Cut 0.79 in. slice from end of Block for metallographic studies.

TABLE 3

Summary of Deposition Data During Processing

| Cycle No. | Porosity % | Density g./cc | Weight Deposited Ta$_2$O$_5$[2] g. | Weight Deposited Carbon[3] g. | Ratio C/Ta$_2$O$_5$ | TaC + C g. | TaC[5] g. | Free C[6] g. |
|---|---|---|---|---|---|---|---|---|
| 0 | 48.50[1] | 1.051 | — | — | — | — | — | — |
| 1 | 43.08 | 1.311 | ND | 19.9 | ND | 103.6 | 102.9 | 0.7 |
| 2 | 42.79 | 1.563 | 116 | 25.5 | 0.220 | 102.0 | 101.3 | 0.7 |
| 3 | 36.84 | 1.839 | 123 | 29.0 | 0.236 | 109.5 | 107.0 | 2.5 |
| 4 | 34.34 | 2.071 | 101.5 | 25.5 | 0.251 | 91.5 | 88.7 | 2.8 |

TABLE 3-continued

Summary of Deposition Data During Processing

| Cycle No. | Porosity % | Density g./cc | Weight Deposited $Ta_2O_5^{(2)}$ g. | Weight Deposited Carbon$^{(3)}$ g. | Ratio C/$Ta_2O_5$ | TaC + C g. | TaC$^{(5)}$ g. | Free C$^{(6)}$ g. |
|---|---|---|---|---|---|---|---|---|
| 5 | 31.20 | 2.303 | 105.7 | 24.2 | 0.229 | 92.8 | 92.3 | 0.5 |
| 6 | 30.29 | 2.501 | 93.0 | 19.4 | 0.209 | 79.4 | 81.2 | −1.8 |
| 7 | 27.74 | 2.664 | 77.2 | 24.3 | 0.315 | 75.4 | 67.4 | 8.0 |
| 8 | 24.92 | 2.854 | 74.6 | 20.6 | 0.276 | 68.5 | 65.2 | 3.4 |
| 9 | 23.44 | 3.006 | 66.3 | 16.2 | 0.244 | 58.0 | 57.9 | 0.1 |
| 10 | 23.04 | 3.161 | 66.2 | 15.6 | 0.236 | 50.1 | 57.8 | 0.3 |
| 11 | ND | 3.275 | 48.2 | 14.1 | 0.293 | 53.1 | 42.1 | 11.2 |
| 12 | 19.67 | 3.408 | 59.2 | 12.4 | 0.207 | 49.8 | 51.7 | −1.9 |
| 13 | 17.70 | 3.539 | 51.8 | 11.0 | 0.212 | 45.1 | 45.2 | −0.1 |
| 14 | 16.75 | 3.620 | 40.1 | 9.4 | 0.234 | 34.2 | 35.0 | −0.8 |
| 15 | 17.09 | 3.741 | 51.0 | 11.1 | 0.218 | 44.8 | 44.6 | 0.2 |
| 16 | 15.44 | 3.851 | 44.2 | 13.2 | 0.299 | 39.6 | 38.6 | 1.0 |
| 17 | 14.14 | 3.962 | 42.8 | 11.3 | 0.264 | 39.8 | 37.4 | 2.4 |
| 18 | 13.74 | 4.050 | 39.6 | 10.3 | 0.260 | 35.8 | 34.6 | 1.2 |
| Totals | | | | | | 1181.4 | 1150.9 | 30.4 |

$^{(1)}$Back calculated value
$^{(2)}$Block weight increase after Ta(OC$_2$H$_5$)$_5$ impregnation and 600° C. heat treatment.
$^{(3)}$Block weight increase from sugar char.
$^{(4)}$Total block weight increase during cycle.
$^{(5)}$Weight of TaC formed as calculated from the weight of Ta$_2$O$_5$ deposited, (2).
$^{(6)}$Weight of TaC plus carbon, (4) minus TaC, (5).

TABLE 4

Final Composite Composition

| | By Weight | By Volume |
|---|---|---|
| Carbon | | |
| Thornel 50 Fiber | 14.9 | 32.9 |
| Ashland A240 ™ pitch char | 14.1 | 28.1 |
| Sugar Char | 1.6 | 2.7 |
| HiPiC Allied 15V Char | 7.8 | 15.5 |
| TaC | 61.6 | 15.5 |
| Porosity | | 5.1 |

EXAMPLE 3

To a furfural-furfurol mixture containing 3 volume percent of furfural and 97 volume percent of furfuyl alcohol was added 6 parts by weight of phthalic anhydride per 100 parts by weight of the furfural-furfurol mixture.

Step 1. The resin was vacuum impregnated into a rigidized graphite preform of the type used in examples 1 and 2.

Step 2. The resin was heat cured either in the atmosphere or under pressure in an autoclave. The atmospheric cure comprised of heating at 90°–95° C. for 18 hours followed by heating at 180° to 220° C. for two hours. The autoclave procedure comprised heating at 95°–105° C. under 100 psi for 2 hours, at 130°–140° C. under 100 psi for 2 hours, and finally at 180°–200° C. under 100 psi for two hours.

Step 3. The resin was next pyrolyzed by heating the preform in an argon atmosphere at a rate of 100° C. hr. from room temperature to 200° C. and at a rate of 20° C./hr. from 200° C. to 600° C.

Step 4. The dry preform was impregnated with Ta(OCH$_2$CH$_3$)$_5$ in a dry atmosphere.

Step 5. The preform was then autoclaved to 200° C. in a steam (distilled water) atmosphere under 150 to 300 psi of pressure to form a Ta$_2$O$_5$ precipitate throughout the preform.

Step 6. The preform was then pyrolyzed in an argon atmosphere by heating to 500° to 600° C. at a rate of 60° C./hr.

It was usually necessary to repeat steps 4 through 6 to adjust the Ta$_2$O$_5$ to carbon content from the furfural-furfurol resin.

Step 7. The preform was then heat treated at a temperature above 1400° C. (e.g. 2200° C.) to form TaC.

Steps 1 through 7 were repeated until the desired porosity was achieved.

Note that the Ta(OCH$_2$CH$_3$)$_5$ used in examples 1, 2, and 3 was obtained from the Research Organic/Inorganic Chemical Corporation of Sun Valley, Calif. where it was prepared.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A process for producing a fiber-reinforced tantalum carbide composite which comprises the steps of:

(1) impregnating a multidirectional woven fiber preform wherein the fibers are selected from the group consisting of silicon carbide fibers, carbon fibers, and graphite fibers with an aqueous solution of sugar;

(2) pyrolyzing the sugar to form a reactive carbon char in the preform;

(3) impregnating the preform under anhydrous conditions with a tantalum containing organometallic compound selected from the group consisting of Ta(OCH$_3$)$_5$ and Ta(OCH$_2$CH$_3$)$_5$;

(4) contacting the tantalum containing organometallic compound with water to form Ta$_2$O$_5$ as a precipitate in the preform; and (5) heating the preform at a temperature of from 1400° C. to 3000° C. to react the Ta$_2$O$_5$ with the carbon to form TaC.

2. The process of claim 1 wherein the fibers are graphite fibers.

3. The process of claim 2 where a 4-D, 5-D, or 7-D weave is used.

4. The process of claim 2 wherein the sugar is selected from the group consisting of glucose, fructose, sucrose, maltose, lactose, and mixtures thereof.

5. The process of claim 4 wherein the sugar is sucrose.

6. The process of claim 2 wherein the tantalum containing organometallic compound is $Ta(OCH_3)_5$.

7. The process of claim 6 wherein the $Ta(OCH_3)_5$ is dissolved in methanol for the impregnation step (3).

8. The process of claim 6 wherein a melt of $Ta(OCH_3)_5$ is impregnated into the preform in step (3).

9. The process of claim 2 wherein the tantalum containing organometallic compound is $Ta(OCH_2CH_3)_5$.

10. The process of claim 1 or 2 wherein the pyrolysis in step (2) is carried out at a temperature of from 400° to 600° C.

11. The process of claim 1 or 2 wherein the tantalum containing compound is contacted in step (4) with steam at a temperature of from 100° to 200° C. under a pressure of from 150 to 300 psi.

12. The process of claim 1 or 2 wherein the temperature used in step (5) for the formation of TaC is from 1400° to 2700° C.

13. The process of claim 1 or 2 wherein between step (1) and step (2) the sugar is broken down a temperature heating slowly (0.1°–4° C./min) to 180°–250° C.

14. The process of claim 1 or 2 wherein steps (1) and (2) are repeated in a plurality of cycles until enough reactive carbon has been deposited to yield the desired percentages of tantalum carbide and carbon in step (5).

15. The process of claim 1 or 2 wherein steps (1) through (5) are repeated until the desired porosity is achieved in the preform.

16. A process for producing a fiber-reinforced tantalum carbide composite which comprises the steps of:

(1) impregnating a multidirectional woven fiber preform wherein the fibers are selected from the group consisting of silicon carbide fibers, carbon fibers, and graphite fibers with a thermal setting resin selected from the group consisting of phenolic resins, epoxy resins, and furfuryl resins;

(2) curing the thermal setting resin;

(3) pyrolyzing the thermal setting resin to form a reactive carbon char in the preform;

(4) impregnating the preform under anhydrous conditions with a tantalum containing organometallic compound selected from the group consisting of $Ta(OCH_3)_5$ and $Ta(OCH_2CH_3)_5$;

(5) contacting the tantalum containing organometallic compound with water to form $Ta_2O_5$ as a precipitate in the preform; and (6) heating the preform at a temperature of from 1400° C. to 3000° C. to react the $Ta_2O_5$ with carbon to form TaC.

17. The process of claim 16 wherein the fibers are graphite fibers.

18. The process of claim 17 where a 4-D, 5-D, or 7-D weave is used.

19. The process of claim 16 wherein the thermal setting resin is a furfural-furfurol resin.

20. The process of claim 17 wherein the tantalum containing organometallic compound is $Ta(OCH_3)_5$.

21. The process of claim 20 wherein the $Ta(OCH_3)_5$ is dissolved in methanol for the impregnation step (4).

22. The process of claim 20 wherein a melt of $Ta(OCH_3)_5$ is impregnated into the preform in step (4).

23. The process of claim 17 wherein the tantalum containing organometallic compound is $Ta(OCH_2CH_3)_5$.

24. The process of claim 16 or 17 wherein the pyrolysis in step (3) is carried out at a temperature of from 400° to 600° C.

25. The process of claim 16 or 17 wherein the tantalum containing compound is contacted in step (5) with steam at a temperature of from 100° to 200° C. under a pressure of from 150 to 300 psi.

26. The process of claim 16 or 17 wherein the temperature used in step (6) for the formation of TaC is from 1400° to 2700° C.

27. The process of claim 16 or 17 wherein steps (1), (2), and (3) are repeated in a plurality of cycles until enough reactive carbon has been deposited to yield the desired percentages of tantalum carbide and carbon in step (6).

28. The process of claim 16 or 17 wherein steps (1) through (6) are repeated until the desired porosity is achieved in the preform.

29. A process for producing a fiber-reinforced tantalum carbide composite which comprises the steps of:

(1) impregnating a multidirectional woven fiber preform wherein the fibers are selected from the group consisting of silicon carbide fibers, carbon fibers, and graphite fibers with a pitch selected from the group comprising petroleum pitches and coal tar pitches;

(2) pyrolyzing the pitch to form a reactive carbon char in the preform;

(3) impregnating the preform under anhydrous conditions with a tantalum containing organometallic compound selected from the group consisting of $Ta(OCH_3)_5$ and $Ta(OCH_2CH_3)_5$;

(4) contacting the tantalum containing organometallic compound with water to form $Ta_2O_5$ as a precipitate in the preform; and (5) heating the preform at a temperature of from 1400° C. to 3000° C. to react the $Ta_2O_5$ with carbon to form TaC.

30. The process of claim 29 wherein the fibers are graphite fibers.

31. The process of claim 30 where a 4-D, 5-D, or 7-D weave is used.

32. The process of claim 30 wherein the tantalum containing organometallic compound is $Ta(OCH_3)_5$.

33. The process of claim 32 wherein the $Ta(OCH_3)_5$ is dissolved in methanol for the impregnation step (3).

34. The process of claim 32 wherein a melt of $Ta(OCH_3)_5$ is impregnated into the preform in step (3).

35. The process of claim 30 wherein the tantalum containing organometallic compound is $Ta(OCH_2CH_3)_5$.

36. The process of claim 29 or 30 wherein the pyrolysis in step (2) is carried out at a temperature of from 400° to 600° C.

37. The process of claim 29 or 30 wherein the tantalum containing compound is contacted in step (4) with steam at a temperature of from 100° to 200° C. under a pressure of 150 to 300 psi.

38. The process of claim 29 or 30 wherein the temperature used in step (5) for the formation of TaC is from 1400° to 2700° C.

39. The process of claim 29 or 30 wherein steps (1) and (2) are repeated in a plurality of cycles until enough reactive carbon has been deposited to yield the desired percentages of tantalum carbide and carbon in step (5).

40. The process of claim 29 or 30 wherein steps (1) through (5) are repeated until the desired porosity is achieved in the preform.

* * * * *